United States Patent Office 2,912,422
Patented Nov. 10, 1959

2,912,422
CATALYTIC PROCESS

Peter Fotis, Jr., Highland, and Donald L. Esmay, Munster, Ind., assignors to Standard Oil Company, Chicago, Ill., a corporation of Indiana No Drawing. Application September 30, 1954
Serial No. 459,517

9 Claims. (Cl. 260—94.9)

This invention relates to a novel catalytic process for the conversion of ethylene to normally solid polymeric materials of relatively high molecular weight. More particularly, the present invention relates to a process for the conversion of ethylene by contact with the hydride of an alkali metal having an atomic number of at least 11 and an adsorbent alumina-containing material to produce normally solid high molecular weight polymers. The term "alkali metal" as used herein is intended to be limited to alkali metals having an atomic number of at least 11.

One object of our invention is to provide novel and highly useful catalysts for the preparation of normally solid polymers from ethylene or ethylene-containing gas mixtures. Another object is to provide a relatively low temperature, low pressure process for the conversion of gas streams containing ethylene into substantial yields of normally solid polymers having molecular weights ranging upwardly from 300 or specific viscosities, as hereinafter defined, above about 1000. An additional object of our invention is to provide cheap catalytic combinations for effecting the purposes of the present invention.

Briefly, the inventive process comprises substantial conversion of ethylene to normally solid polymers ranging in consistency from grease-like to wax-like or tough, resinous materials, by contacting ethylene with the hydride of an alkali metal having an atomic number of at least 11 and an adsorbent alumina-containing material (more fully specified hereinafter) at a conversion temperature between about 50° C. and about 250° C. at atmospheric or superatmospheric pressures for a period of time sufficient to effect the desired conversion, followed by recovery of the solid polymeric materials thus produced. Preferably, the catalyst is a pre-formed combination of the defined alkali metal hydride with the adsorbent alumina-containing material, prepared, in general, by deposition of the alkali metal upon said adsorbent to produce a dispersion of alkali metal upon said adsorbent in which the alkali metal has, preferably, colloidal dimensions or an area just exceeding the atomic area of the alkali metal, followed by conversion of the alkali metal to hydride by treatment with hydrogen under suitable conditions, e.g., temperatures between about 50° C. and about 400° C. and hydrogen pressures of about 15 p.s.i. to about 1500 p.s.i. or more.

The adsorbent alumina-containing material is selected from the class consisting of the activated adsorptive aluminas of commerce which are known to be members of the gamma-alumina family, including the so-called eta-alumina (note, for example, P. J. Nahin et al., Ind. Eng. Chem., 2021 (1949); H. C. Stumpf et al., Ind. Eng. Chem. 42, 1398–1403 (1950); M. K. B. Day et al., J. Phys. Chem. 57, 946–950 (December 1953); J. F. Brown et al., J. Chem. Soc. 1953, 84); argillaceous materials, particularly montmorillonitic clays and bauxite, for example, clays and clay-like materials which have heretofore been employed in the catalytic cracking of hydrocarbon oils to produce gasoline, such as the acid-treated clays (Filtrol, Superfiltrol, etc.); synethetic silica-alumina composites containing at least about 1% of alumina, for example, the calcined silica-alumina composites (which may also contain magnesium, thoria or zirconia) which have heretofore been employed in the catalytic cracking of hydrocarbon oils (note, for example, "Advaces in Catalysis," vol. IV, pages 1+, especially pages 6 and 7, by R. C. Hansford, published by Academic Press, Inc., N.Y., 1952, and, in the same volume, a chapter by H. E. Ries, Jr., pages 87 and following, especially the tables at pages 93–4); and fluorided gamma-aluminas. Gamma-aluminas may be employed containing up to about 90 weight percent of oxides of metals such as titania and zirconia.

In effecting contacting of ethylene with the catalyst, it is highly desirable to supply to the reaction zone a liquid medium which serves both as a reaction medium and a solvent for the solid reaction products. Suitable liquid reaction media for polymerization include various hydrocarbons, such as liquid saturated hydrocarbons or an aromatic hydrocarbon such as benzene, toluene or xylenes. The conversion of ethylene can be effected in the absence of a liquid reaction medium and the catalyst containing accumulated solid polymeric conversion products can be treated from time to time, within or outside the conversion zone, to effect removal of conversion products therefrom and, if necessary, reactivation or regeneration of the catalyst for further use. The ethylene partial pressure in the reaction zone can be varied between about atmospheric pressure and 50,000 p.s.i.g. or even higher pressures, but is usually effected at pressures between about 200 and 10,000 p.s.i., for example, at about 1000 p.s.i.

The practice of the process of the present invention leads to polymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like polymers having an approximate molecular weight range of 300 to 700, wax-like polymers having an approximate specific viscosity ($\times 10^5$) between about 1000 and 10,000, and tough, resinous polymers having an approximate specific viscosity ($\times 10^5$) of 10,000 to more than 300,000 [($\eta$ relative $-1 \times 10^5$].

Ethylene may be polymerized alone or in the presence of propylene or other mono-olefinic hydrocarbons such as n-butylenes, t-butylethylene; butadiene, isoprene, and the like, usually in proportions between about 1 and about 25% by weight, based on the weight of ethylene.

The catalytic conversion of ethylene to solid polymers can not be achieved by contact of the mono-olefinic hydrocarbon with an alkali metal hydride at relatively low temperatures within the range of about 50 to about 250° C. and at atmospheric and superatmospheric pressures; this is likewise true when adsorbent alumina-containing materials, alone, are contacted with ethylene. Surprisingly, we have discovered that a combination of alkali metal hydride and adsorbent alumina-containing material is an effective catalyst for the substantial conversion of ethylene to normally solid polymers at low temperatures (50 to about 250° C.) and pressures ranging upward from atmospheric pressure. As will be shown by example hereinafter, the alkali metal hydride and adsorbent alumina-containing material can be added as discrete masses to the polymerization reaction zone, although it is highly preferable to pre-form the catalytic combination before use thereof in polymerization. It is possible that even when the components of the catalyst are added separately to the reaction zone, they combine therein to produce a catalyst which is a dispersion of the alkali metal hydride upon the adsorbent alumina-containing material; it will be understood however, that we are not bound by any theoretical explanations advanced herein.

Sodium, potassium, rubidium and cesium hydrides can be used, of which the first two are preferred for use in our invention because of their relative availability and cheapness. We can employ not only the hydrides of the individual alkali metals, but hydrides of alloys or mixtures of said alkali metals with each other and/or with other metals such as calcium, barium, magnesium, aluminum and the like. The proportion of alkali metal hydride which may be employed ranges from about 1 to about 50% by weight, based on the weight of the adsorbent alumina-containing material, more often between about 5 and about 25% by weight, or about 10 weight percent. In its preferred form, the catalyst comprises a pre-formed colloidal dispersion of the alkali metal hydride upon the adsorbent alumina-containing material. Sodium can readily be dispersed as colloidal particles of 0.5 to about 1000 millimicrons on activated alumina or other suitable adsorbents, at sodium concentrations up to about 20 to 25 weight percent, based on the weight of the adsorbent, and can then be reduced to sodium hydride with hydrogen.

The dispersion of the alkali metal hydride on the alumina-containing adsorbent can be effected by any known method and does not form part of the present invention.

Suitable alumina-containing adsorbent materials have BET surface areas in the range of about 100 to about 700 square meters per gram, more often about 150 to 300 square meters per gram, and average pore radius of about 10 to 100 A., usually of the order of about 25 A. Relatively low surface area aluminas such as alpha- or beta-aluminas cannot be employed to prepare catalysts for the purpose of this invention. We prefer to use gamma-aluminas and can use eta-alumina, which is a member of the gamma-alumina family. Another surprising discovery is that high surface area adsorbent solid materials such as activated charcoal and titania are likewise not useful for the preparation of catalysts for the purpose of the present invention.

The catalysts of this invention are partially or wholly deactivated by oxygen, moisture, carbon dioxide, acetylene, nitrogen compounds and sulfur compounds. Consequently, contact of the catalyst or catalyst components with air, moisture or other noxious materials named should be minimized or avoided during the preparation of the catalyst and the use thereof in the conversion of the charging stock to solid materials. Before use in catalyst preparation, it is desirable to thoroughly dry, and possibly to evacuate, the adsorbent alumina-containing materials. The catalyst composite may be diluted with inert solid materials which have no deleterious effect upon the polymerization reaction in order to modify catalyst activity, if desired. The catalyst can be employed in various forms and sizes, e.g., as powder, granules, microspheres, broken filter cake, lumps, or shaped pellets. A convenient form in which the catalysts may be employed is as granules of about 20–200 mesh/inch size range.

The proportion of alkali metal hydride catalyst, based on ethylene, may range upwardly from 1 weight percent and may be, for example, in the range of about 5 to about 25 weight percent.

Although the polymerization temperature range encompasses temperatures between about 50° C. and about 250° C., ordinarily it is preferred to employ the range of about 125° C. to about 175° C. in order to maximize the yield of solid or high molecular weight polymer.

Ethylene partial pressures may be varied within the range of about 15 p.s.i.g. to the maximum pressure which can economically be employed in suitable commercial equipment, for example up to as much as 50,000 p.s.i. A convenient ethylene partial pressure range for the manufacture of solid polymers by the use of the present catalysts is about 200 to about 10,000 p.s.i., which constitutes a distinct advantage over the commercial high pressure ethylene polymerization processes which apparently require operating pressures in the range of about 20,000 to about 50,000 p.s.i.

The ethylene may contain inert hydrocarbons, as in refinery gas streams, for example, methane, ethane, propane, etc. However, it is preferred to employ as pure and concentrated ethylene charging stocks as it is possible to obtain.

The ethylene can be polymerized in the gas phase and in the absence of a liquid reaction medium by contact with the catalyst. Upon completion of the desired polymerization reaction it is then possible to treat the catalyst for the recovery of the solid polymerization products, for example by extraction with suitable solvents.

The contact time or space velocity employed in the polymerization process will be selected with reference to the other variables, catalysts, the specific type of product desired and the extent of ethylene conversion desired in any given run or pass over the catalyst. In general, this variable is readily adjustable to obtain the desired results. In operations in which the ethylene is caused to flow continuously into and out of contact with the solid catalyst, suitable liquid hourly space velocities are usually selected between about 0.1 and about 10 volumes, preferably about 0.5 to 5 or about 2 volumes of ethylene solution in a liquid reaction medium, which may be a paraffinic hydrocarbon such as n-pentane, an aromatic hydrocarbon such as benzene or xylenes; tetralin or other cycloaliphatic hydrocarbon, such as cyclohexane or Decalin (decahydronaphthalene).

The amount of ethylene in such solution may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products tend to drop sharply. In general, the rate of ethylene polymerization tends to increase with increasing concentration of the ethylene in the liquid reaction medium. However, the rate of ethylene polymerization to form high molecular weight, normally solid polymers is preferably not such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the catalyst particles or fragments may occur, resulting in catalyst carry-over as fines with the solution of polymerization products and extensive loss of catalyst from the reactor.

In batch operations, operating periods between one-half and about 30 hours or even longer are employed and the reaction autoclave is charged with ethylene as the pressure falls as a result of the olefin conversion reaction. The reaction period should be sufficiently long to permit substantial ethylene conversion to a solid polymer.

Various classes of hydrocarbons or their mixtures which are liquid under the polymerization conditions of the present process can be employed. Certain classes of aliphatic hydrocarbons can be employed as a liquid hydrocarbon reaction medium in the present process. Thus, we can employ various saturated hydrocarbons (alkanes and cycloalkanes) which are liquid under the polymerization reaction conditions. Either pure alkanes or cycloalkanes or commercially available mixtures, freed of catalyst poisons, can be employed. For example, we can employ straight run naphthas or kerosenes containing alkanes and cycloalkanes. Specifically, we can employ liquid or liquefied alkanes such as n-butane, n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, Decalin, methyldecalins, dimethyldecalins and the like.

We can also employ a liquid hydrocarbon reaction medium comprising liquid olefins, e.g., n-hexenes, cyclohexene, octenes, hexadecenes and the like, although we prefer to use saturated or aromatic hydrocarbons.

The normally solid polymerization products which are retained on the catalyst surface or grease-like ethylene polymers may themselves function to some extent as a liquefied hydrocarbon reaction medium, but it is highly desirable to add a viscosity-reducing hydrocarbon, such as those mentioned above, thereto in the reaction zone.

Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, we can employ such aromatic hydrocarbons as ethylbenzene, isopropylbenzene, sec-butylbenzene, t-butylbenzene or other t-alkylaromatic hydrocarbons, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We can also employ certain alkylnaphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

The liquid hydrocarbon reaction medium should be freed of poisons before use in the present invention by acid treatment, e.g., with anhydrous p-toluenesulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

C.P. xylenes can be purified by refluxing with a mixture of 8 weight percent $MoO_3$ on $Al_2O_3$ catalyst and $LiAlH_4$ (50 cc. xylene—1 g. catalyst—0.2 g. $LiAlH_4$) at atmospheric pressure, followed by distillation of the xylenes. Still more effective purification of solvent can be achieved by heating it to about 225–250° C. with either sodium and hydrogen or NaH plus 8 weight percent $MoO_3$—$Al_2O_3$ catalyst in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone.

When alkylatable aromatic hydrocarbon solvents are employed alkylation thereof by ethylene may occur under the reaction conditions. The alkylate is removed with grease in the present process, can be separated therefrom by fractional distillation and can, if desired, be returned to the polymerization zone. The alkylation problem can be avoided by effecting polymerization in the absence of solvents or in the presence of non-alkylatable solvents such as saturated liquid hydrocarbons, particularly n-paraffins such as n-pentane. The polymerization is not dependent on the occurrence of alkylation, which seems merely to be a co-reaction of the ethylene.

The following specific examples and data are introduced in order to illustrate but not unduly to limit the invention. The exemplary operations were effected in 250 cc. capacity stainless steel-lined pressure vessels provided with a magnetically-actuated stirrup-type stirrer which was reciprocated through the reaction zone (Magne-Dash reactors). Specific viscosities (Staudinger) which are reported hereinafter are defined as relative viscosity minus one and relative viscosity is the ratio of the time of efflux of a solution of 0.125 g. polymer in 100 cc. C.P. xylenes at 110° C. from the viscosimeter as compared with the time of efflux of 100 cc. C.P. xylenes at 110° C. Melt viscosities were determined by the method of Dienes and Klemm, J. Appl. Phys. 17, 458–71 (1946).

*Example 1*

The reactor was charged with 100 ml. of dried benzene, 2 g. of commercial sodium hydride and separately with 10 g. of an activated adsorptive alumina. The reactor was closed and pressure-tested, then pressured to about 450 p.s.i.g. with ethylene. The temperature was raised to about 134° C. and maintained at this temperature for about 20 hours during which the pressure fell from about 925 to about 850 p.s.i.g. After cooling to room temperature and depressuring, the reaction mixture was filtered. The filtrate (about 71 ml.) showed no change in refractive index from that of the feed benzene. The solid residue was extracted with boiling xylene. Cooling and dilution with methanol yielded about 0.4 g. of a nearly white, solid polymer of ethylene.

*Example 2*

Finely dispersed sodium on an activate adsorptive alumina was prepared by stirring 2 grams of sodium with 10 grams of alumina at 250° C. in an inert atmosphere. A stream of hydrogen was purified by passage through alkaline pyrogallol, concentrated sulfuric acid, ascarite and anhydrone and was then passed over the sodium-alumina at about 250° C. for about 55 minutes at a flow rate between 0.3 and 0.4 liter per minute. The sodium-alumina was thereby converted to sodium hydride in a state of fine dispersion on alumina, with a color change from black to grey. The autoclave was charged with 100 ml. of dried benzene, the sodium hydride-alumina catalyst and heated under ethylene pressure to about 140° C. During 6.5 hours at about 140° C. a total drop of about 1490 p.s.i. was observed at about 700 to 875 p.s.i. of ethylene. The maximum pressure drop per hour was about 400 p.s.i.; average, about 230 p.s.i. After cooling to room temperature and depressuring, the reaction mixture was filtered. The filtrate ($n_D^{20}$ 1.4891; 87 ml.) was found by distillation to be about 53 vol. percent benzene, with the remainder higher boiling alkylate. Extraction of the solid residue with xylenes, followed by cooling of the xylene filtrate and dilution with methanol yielded 8.4 g. of nearly white, solid polymer. The specific viscosity of the polymer was $7900 \times 10^{-5}$.

*Example 3*

A highly extended, alumina-supported sodium hydride was prepared as in Example 2 and in the same amount. The catalyst was charged to the autoclave and employed for the polymerization of ethylene without a solvent at 140° C. and initial ethylene pressure of 1000 p.s.i. The reaction was continued for 23 hours. The excess catalyst was destroyed by adding methanol to the reactor. Extraction of the residual solid materials in the reactor with hot xylenes, followed by hot filtration of the mixture, cooling of the filtrate and dilution of the filtrate with methanol resulted in the precipitation of 3.5 g. of solid wax-like polyethylene.

Example 4

Sodium hydride supported upon an activated adsorptive alumina was prepared by the same method and in the same amount as in Example 2. n-Pentane was purified by heating and stirring for 16 hours with a dispersion of sodium on activated alumina at 140° C. The autoclave was charged under an inert gas atmosphere with the purified n-pentane and the sodium hydride-alumina catalyst and ethylene polymerization was effected in the autoclave at 138° C. and ethylene partial pressure of about 1000 p.s.i. The product was worked up as in previous examples to yield 14.9 grams of a normally solid polymer. The pentane was distilled from the mixture of reaction products and was found to be unchanged by the process.

Example 5

Sodium hydride extended on a synthetic silica-alumina was prepared by coating 2 g. of molten sodium on 10 g. of a commercial synthetic cracking catalyst comprising 14.4% of activated alumina and the remainder silica, together with very small proportions of impurities (American Cyanamid Co. Aerocat MS–B) and passing hydrogen thereover at 250° C. The reactor was charged with 100 ml. benzene and the catalyst under a blanket of inert gas, ethylene was charged and polymerization was effected with stirring of the reactor contents at 138° C. at a partial ethylene pressure of 900 p.s.i. Polymerization was continued for 19 hours. The products were worked up as before to yield 1.5 g. of a solid, white polymer of ethylene. About 16 volume percent of the benzene was alkylated.

Example 6

The catalyst preparation of Example 5 was repeated but Filtrol was substituted for the synthetic silica-alumina catalyst of Example 5. The Filtrol is a montmorillonitic clay containing about 14 weight percent alumina, the remainder being silica, together with small proportions of various impurities. Polymerization of ethylene was carried out under the conditions of Example 5 for 16 hours to yield 0.6 g. of a white, solid polymer. Refractive index measurement revealed that no change in the benzene had occurred.

Example 7

Potassium was extended on an activated adsorptive alumina by stirring a mixture of 2 grams of potassium and 10 grams of the alumina in an inert atmosphere at about 250° C. Hydrogen, purified as in Example 2, was passed over the potassium-alumina at about 250° C. for about 30 minutes at 0.3 to 0.4 liter per minute. During the hydrogenation the potassium-alumina turned from black to light grey. The potassium hydride-alumina catalyst was added to 100 ml. of dried benzene in the autoclave and ethylene was polymerized therein for 6.5 hours at about 140° C. at ethylene pressures between 720 and 920 p.s.i. After cooling to room temperature the reaction mixture was filtered. The filtrate (87 ml.; $n_D^{20}$ 1.4910) was found by distillation to be about 30 volume percent benzene, with the remainder higher boiling alkylate. Extraction of the solid residue with boiling xylene followed by cooling of the xylene filtrate and dilution with methanol yielded about 8.7 g. of nearly white, solid polymer. The specific viscosity of the polymer was $10,000 \times 10^{-5}$.

The above-described procedure for the preparation of sodium hydride supported upon an activated alumina was repeated but 10 g. of commercial C.P. powdered titanium dioxide was substituted for the alumina. The sodium hydride-titanium dioxide preparation was added to 100 ml. of dried benzene in the autoclave, ethylene was introduced and the temperature of the contents was raised to 140° C., with stirring, at which temperature it was maintained for about 2.5 hours under 1000 p.s.i. of ethylene. Since very little pressure drop was observed, the temperature of the reaction mixture was raised to 165° C. and maintained at about 1000 p.s.i. ethylene pressure for 23 hours. The total observed pressure drop was 50 p.s.i. The products were worked up as before and it was found that less than 0.1 g. of solid polymer was produced. Distillation of the reaction solvent and determination of its refractive index showed that no alkylation of benzene had occurred.

Sodium (2 g.) was heated with powdered C.P. sodium chloride (20 g.) at 250° C. and the resultant supported sodium was then heated in hydrogen at 250° C. under the conditions previously described for the preparation of sodium hydride-alumina catalysts. The resultant sodium hydride-sodium chloride was added to 100 ml. of dried benzene in the autoclave and an attempt was made to polymerize ethylene therein at 137° C. and ethylene pressure of 1000 p.s.i. No pressure drop was observed during about 19 hours. The reaction mixture was worked up as before but it was found that neither polymerization of the ethylene nor alkylation of the benzene had occurred.

Sodium hydride extended upon an activated charcoal was prepared in the same manner as sodium hydride-alumina by substituting 10 grams of an activated coconut charcoal, which had been purified by treatment with nitric acid, for the alumina of the previous preparation. The sodium hydride-charcoal was added to 100 ml. of dried benzene in the autoclave and an attempt was made therein to polymerize ethylene at 144° C. and initial ethylene partial pressure of 900 p.s.i. Over a period of 23 hours, the total ethylene pressure drop was over 1200 p.s.i. Ethylene was repressured into the autoclave from time to time to maintain its partial pressure at a value between about 750 and about 850 p.s.i. The reaction mixture was worked up as before but it was found that no solid ethylene polymers were produced. About 56 volume percent of the benzene solvent was alkylated by the ethylene.

The polymers produced by the process of the present invention, especially the polymers having high specific viscosities, can be blended with polyethylenes produced by other processes. The solid polymers produced by the process of the present invention can be blended in desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V.I. and to decrease oil consumption when the compounded oils are employed in motors; larger amounts of polyethylenes may be compounded with oils of various kinds and for various purposes.

The products can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride or a mixture of sulfur dioxide and chlorine, sulfonation, and other reactions to which hydrocarbons may be subjected.

Having thus described our invention, what we claim is:

1. A process for producing a solid polymeric material, which process comprises contacting ethylene with a catalyst consisting of the hydride of an alkali metal having an atomic number of at least 11 and an adsorbent alumina-containing material selected from the class consisting of gamma-alumina, argillaceous materials, synthetic silica-alumina composites and fluorided alumina, effecting said contacting at a temperature between about 50° C. and about 250° C. for a period of time sufficient to effect a substantial conversion of ethylene to form a solid polymer, and recovering a solid polymer thus produced.

2. The process of claim 1 wherein recovery of said solid polymer comprises extraction of said adsorbent alumina-containing material with a solvent for said solid polymer and recovery of said polymer dissolved in said solvent.

3. The process of claim 1 wherein said alkali metal hydride and said adsorbent are combined as a dispersion of said alkali metal hydride on said adsorbent.

4. The process of claim 1 wherein the temperature is between about 125° C. and about 175° C.

5. A process for producing a solid polymeric material, which process comprises contacting ethylene with a catalyst consisting of the hydride of an alkali metal having an atomic number of at least 11 and an adsorbent alumina-containing material selected from the class consisting of a gamma-alumina, argillaceous materials, synthetic silica-alumina composites and fluorided alumina, effecting said contacting in the presence of a liquid hydrocarbon reaction medium at a temperature between about 50° C. and about 250° C. for a period of time sufficient to effect a substantial conversion of ethylene to a solid polymer, and recovering a solid polymer thus produced.

6. The process of claim 5 wherein said medium is a liquid saturated hydrocarbon.

7. The process of claim 5 wherein said alkali metal hydride is sodium hydride.

8. The process of claim 5 wherein said alkali metal hydride is potassium hydride.

9. The process of claim 5 wherein the temperature is between about 125° C. and about 175° C.

References Cited in the file of this patent
UNITED STATES PATENTS

| | | |
|---|---|---|
| 2,212,155 | Ellis | Aug. 20, 1940 |
| 2,467,245 | Whitman | Apr. 12, 1949 |
| 2,691,647 | Field | Oct. 12, 1954 |
| 2,699,457 | Ziegler | Jan. 11, 1955 |
| 2,726,231 | Field | Dec. 6, 1955 |